United States Patent
Quenerch'du et al.

(10) Patent No.: US 8,573,080 B2
(45) Date of Patent: Nov. 5, 2013

(54) MECHANICALLY-OPERATING ACTUATOR WITH HYDRAULIC DAMPING

(75) Inventors: Marc Quenerch'du, Paris (FR); Hervé Charuel, Nozay (FR); Xavier Jubert, Boulogne Billancourt (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 596 days.

(21) Appl. No.: 12/796,195

(22) Filed: Jun. 8, 2010

(65) Prior Publication Data

US 2010/0313689 A1 Dec. 16, 2010

(30) Foreign Application Priority Data

Jun. 11, 2009 (FR) ..................... 09 02853

(51) Int. Cl.
*F16H 25/22* (2006.01)
(52) U.S. Cl.
USPC ......................... 74/89.23; 74/89.25; 74/89.39
(58) Field of Classification Search
USPC .................... 74/89.23, 89.25, 89.39
See application file for complete search history.

(56) References Cited

U.S. PATENT DOCUMENTS

| 2,835,142 | A | * | 5/1958 | Foster ........................... 74/625 |
| 3,823,758 | A | | 7/1974 | Heese |
| 4,876,906 | A | | 10/1989 | Jones |
| 2005/0056146 | A1 | | 3/2005 | Quenerch'Du |
| 2010/0132350 | A1 | * | 6/2010 | Hirai .............................. 60/327 |

FOREIGN PATENT DOCUMENTS

| EP | 1 515 051 A1 | | 3/2005 |
| FR | 2 739 428 A1 | | 4/1997 |
| FR | 2 859 770 A1 | | 3/2005 |
| GB | 2 344 325 A | | 6/2000 |
| JP | 2003-53587 | * | 2/2003 |

* cited by examiner

*Primary Examiner* — William C Joyce
(74) *Attorney, Agent, or Firm* — Sughrue Mion, PLLC

(57) ABSTRACT

An actuator comprising a body in which a rod is mounted to slide, the actuator including a screw extending inside the rod to co-operate with a nut secured to the rod, the screw being driven in rotation by a motor. The rod is associated with a piston that slides in a cavity of the body so as to define two chambers therein, the chambers being filled with hydraulic fluid and being put into communication via fluid transfer means fitted with at least one regulator member adapted to throttle the fluid expelled from one of the chambers, in at least one travel direction of the rod.

6 Claims, 3 Drawing Sheets

MECHANICALLY-OPERATING ACTUATOR WITH HYDRAULIC DAMPING

The invention relates to a mechanically-operating actuator with hydraulic damping, suitable in particular for operating aircraft undercarriages between a deployed position and a retracted position.

BACKGROUND OF THE INVENTION

Telescopic type hydraulic actuators are known that comprise a body defining a cylindrical cavity and a rod extending through one end of the cavity and secured to a piston that is mounted to slide axially inside the cavity so as to define two hydraulic chambers therein. During movement of the rod, it is known to organize throttling at the outlet from the chamber through which the fluid is expelled in order to provide hydraulic damping. Such throttling establishes resistance that is proportional to the square of the travel speed of the rod.

Electrohydraulic actuators are also known that comprise an electric pump that is arranged to transfer fluid from one chamber to the other of the actuator. It is also possible to organize damping by throttling the fluid being expelled from one of the chambers while the rod is moving. Nevertheless, such an actuator is not capable of operating in an emergency with the rod being driven by the load to which it is coupled, unless the pump is reversible and is capable of being released.

Mechanical actuators are also known that comprise a screw extending inside the rod to co-operate with a nut secured to the rod, the screw being driven in rotation by a motor, with rotation of the screw causing the rod to move axially. In such actuators, damping may be provided by organizing resistance to movement of the rod, e.g. of the friction or electromagnetic type. Nevertheless, the first type of resistance is essentially independent of the travel speed of the rod, while the second type of resistance is quite difficult to organize and is generally a function of the travel speed of the rod, which may be found to be insufficient in certain applications. In addition, such dampers give rise to numerous problems in service, such as wear or lack of reliability.

OBJECT OF THE INVENTION

The invention seeks to propose a mechanically-actuated actuator that presents damping that is simple and reliable.

BRIEF SUMMARY OF THE INVENTION

In order to achieve this object, there is proposed an actuator comprising a body in which a rod is mounted to slide, the actuator including a screw extending inside the rod to co-operate with a nut secured to the rod, the screw being driven in rotation by a motor; and wherein, according to the invention, the rod is associated with a piston that slides in a cavity of the body so as to define two chambers therein, the chambers being filled with hydraulic fluid and being put into communication via fluid transfer means fitted with at least one regulator member adapted to throttle the fluid expelled from one of the chambers, in at least one travel direction of the rod.

Thus, while operating in mechanical mode, the fluid is expelled from one of the chambers to return towards the other via the transfer means while being throttled, at least in one travel direction, thereby contributing to damping any tendency of the load coupled to the actuator to vibrate. In addition, during emergency operation in which the rod is left free to slide while being driven by the load coupled to the actuator, the throttling of the fluid as organized in this way enables a slowing-down force to be exerted that is proportional to the square of the travel speed of the rod.

This produces operation in mechanical mode associated with passive emergency operation, each time with damping or hydraulic braking that is very reliable and completely passive.

It should be observed that in the actuator of the invention, the fluid is used only for damping or braking the movements of the rod, and not for generating said movements, unlike actuators with an incorporated pump, or double-acting actuators such as that of document FR 2 859 770.

In a particularly advantageous aspect of the invention, a method is also provided for monitoring an actuator of the invention, the method consisting in allowing the rod to move freely under the action solely of a load coupled to the rod, and in verifying at least one operating parameter of the load and associated with hydraulic regulation. In particular, a measurement is made of the time that is taken by the rod to move under the effect of the load against the hydraulic regulation as organized in this way, thus making it possible to verify proper operation.

BRIEF DESCRIPTION OF THE DRAWINGS

The invention is understood in the light of the following description given with reference to the accompanying drawings, in which.

DETAILED DESCRIPTION OF THE INVENTION

Figure 1:
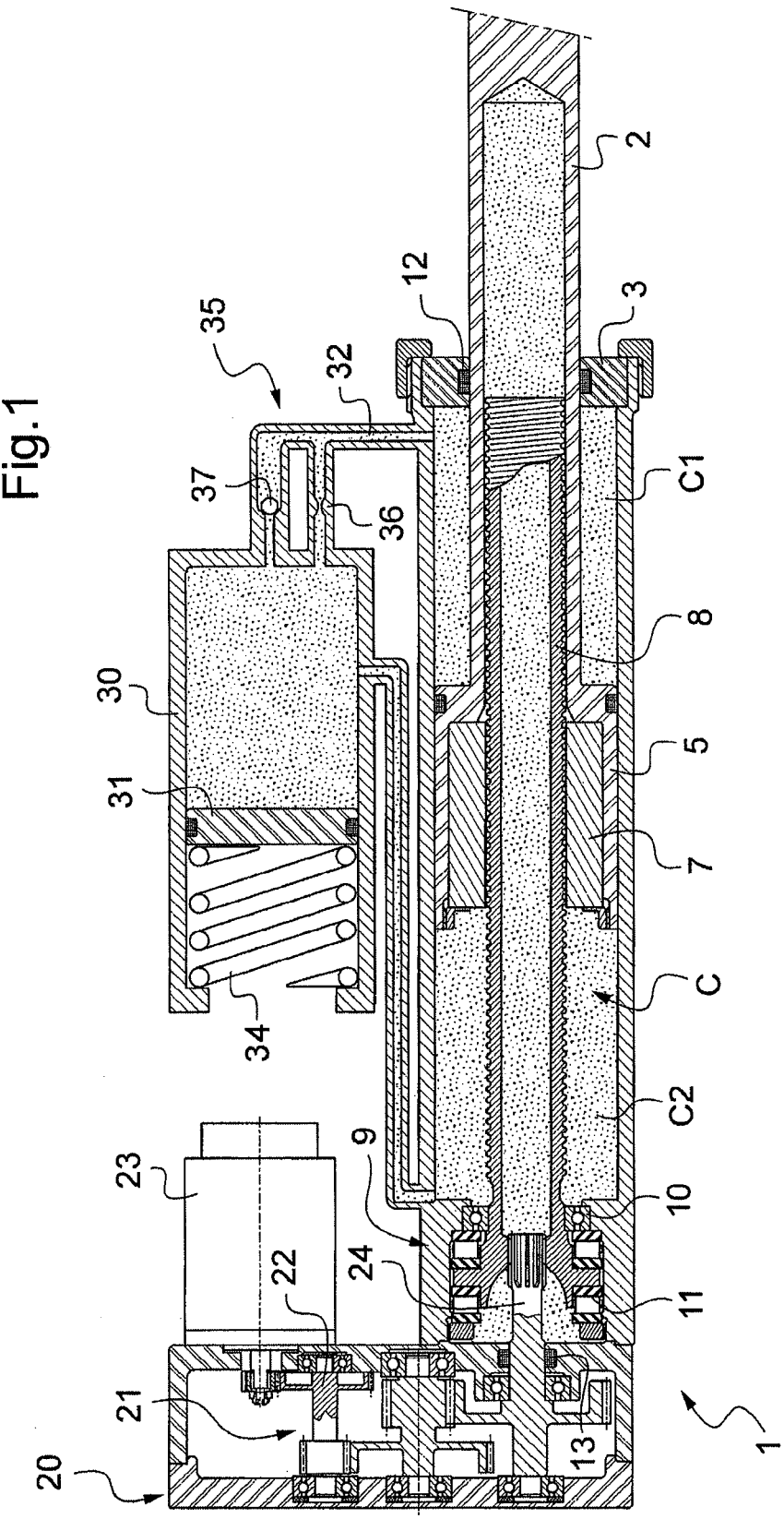
FIG. 1 is a longitudinal section view of an actuator in a first embodiment of the invention.

With reference to FIG. 1, and in accordance with a first embodiment of the invention, the actuator comprises a body 1 defining a cylindrical cavity C extending along a longitudinal axis. The actuator includes a hollow rod 2 that extends axially inside the cavity C to pass through a plug 3 forming a bearing that closes the cavity C at one of its ends. The rod 2 is terminated inside the cavity C by an end forming a bearing 5 that slides inside the cavity C and that defines within the cavity C a chamber C1 (an annular chamber) and a chamber C2 (a full chamber).

The bearing 5 defines internally a housing that receives a nut 7 that is fixedly mounted in said housing, such that the rod 2 and the nut 7 are rigidly secured to each other. A hollow screw 8 extends axially inside the rod 4 to co-operate with the nut 7 via a helical type connection. The screw 8 is centered and guided in rotation by means of a guide bearing 9 comprising, in this example, a combination of a ball bearing 10 and a roller thrust bearing 11.

The end of the cavity opposite from its end that is closed by the plug 3 is closed by an adjacent casing 20 containing gearing 21 having an inlet shaft 22 driven in rotation by an electric motor 23 and an outlet shaft 24 projecting from the casing 20 to penetrate axially into the screw 8 so as to drive it in rotation by means of a connection via fluting. The outlet shaft 24 from the gearing is thus a drive shaft.

Antirotation means (not shown) prevent the rod 2 from rotating relative to the body 1. The antirotation means may be internal to the actuator, or they could equally well be external to the actuator, as in the situation in which the rod and the body of the actuator are coupled to loads via driving connections that prevent the rod from rotating relative to the body.

According to the invention, the hydraulic chambers C2 and C2 are both filled with hydraulic fluid and they are connected to an accumulator 30 forming a hydraulic fluid supply in which some minimum level of pressure is maintained by means of a piston 31 that is loaded in this example by a spring 34. The duct 32 connecting the chamber C1 to the accumulator includes fluid regulator means 35 comprising a constriction 36 connected in parallel with a check valve 37 that is mounted to pass a flow freely from the accumulator 30 to the chamber C1. The accumulator 30 serves to deliver or receive a differential flow rate between the chambers C1 and C2, with the flow rate difference being due essentially to the difference in sectional area of the chambers. The closed hydraulic circuit as organized in this way allows fluid to be passed from one chamber to the other when the rod moves.

It should be observed that the cavity C is sealed by means of a first sealing gasket 12 mounted in the plug 3 and bearing against the outside diameter of the rod 2, and also by means of a second sealing gasket 13 carried by the casing 20 and bearing against the outside diameter of the outlet shaft 24. This gasket serves to keep the hydraulic fluid that fills the chambers C1 and C2 separate from the grease present in the casing 20 of the gearing 21.

The actuator operates as follows. When the motor 23 is powered, it causes the drive shaft 24 to rotate and it thus rotates the screw 8. The screw then causes the nut 7 to move in linear manner, taking the rod 2 with it.

During this movement, the bearing 5 of the rod forms a piston that urges the fluid from one of the hydraulic chambers to pass through the accumulator 30, while the other chamber, of volume that is increasing, is being filled with fluid coming from the accumulator 30.

If the motor 23 is powered so as to extend the rod 2, then the fluid is expelled from the chamber C1 via the duct 32. The fluid cannot pass through the check valve 37, so it is forced to pass via the constriction 36, thereby throttling the fluid, thus generating resistance to free fluid flow and as a result resistance to movement of the rod 2. This provides hydraulic damping that is reliable, simple, and completely passive, while the rod 2 is being extended by the motor 23.

If the motor 23 is powered so as to retract the rod 2, then the fluid is expelled from the chamber C2 in order to be transferred into the accumulator 30, and the fluid leaves the accumulator 30 in order to fill the chamber C1 by passing via the duct 32. As a result, the fluid passes through the check valve 37, thereby bypassing the constriction 36, so that no significant resistance is exerted by the fluid to movement of the rod in this direction.

Finally, the actuator may operate in an emergency mode in the event of the electrical power supply failing. In such a mode, the rod 2 is driven by the load to which it is coupled (typically an un-locked undercarriage that has been released to be lowered under the effect of gravity towards its deployed position). During this movement, the fluid expelled from the chamber C1 is forced to pass through the constriction 36, thereby generating resistance to the movement of the rod 2, and thus regulating the speed at which the rod moves. For such a mode of operation to be possible, it is naturally appropriate for the gearing 21, the motor 23, and the helical connection between the nut 7 and the screw 8 to be reversible.

Putting two chambers in a closed hydraulic circuit in this way offers several advantages:

- the helical connection between the screw 2 and the nut 7, and the connection between the sliding bearing 5 and the body 1 are immersed in fluid, and are therefore well lubricated. The risk of these connections jamming is therefore greatly reduced;
- the presence of fluid in the chambers prevents any moisture from penetrating into the chambers under a pumping effect from the surrounding air, such that the risks of hidden corrosion inside the cavity are eliminated;
- the damping or braking performed by the throttling is automatic and passive;
- the energy dissipation by throttling is very simple, and solves the problems of wear or heating that are encountered with friction or electromagnetic dampers; and
- it is advantageous to allow the actuator to operate in emergency mode deliberately, by not powering the motor, so as to allow the rod to be extended under the action solely of the load, against the hydraulic braking. By measuring the travel speed of the rod, it is thus possible to verify that the hydraulic braking is operating correctly, and to detect any problem therein, and in particular any clogging of the constriction. Thus, although it is purely passive, the damper or the hydraulic brake can nevertheless be tested.

Figure 2:
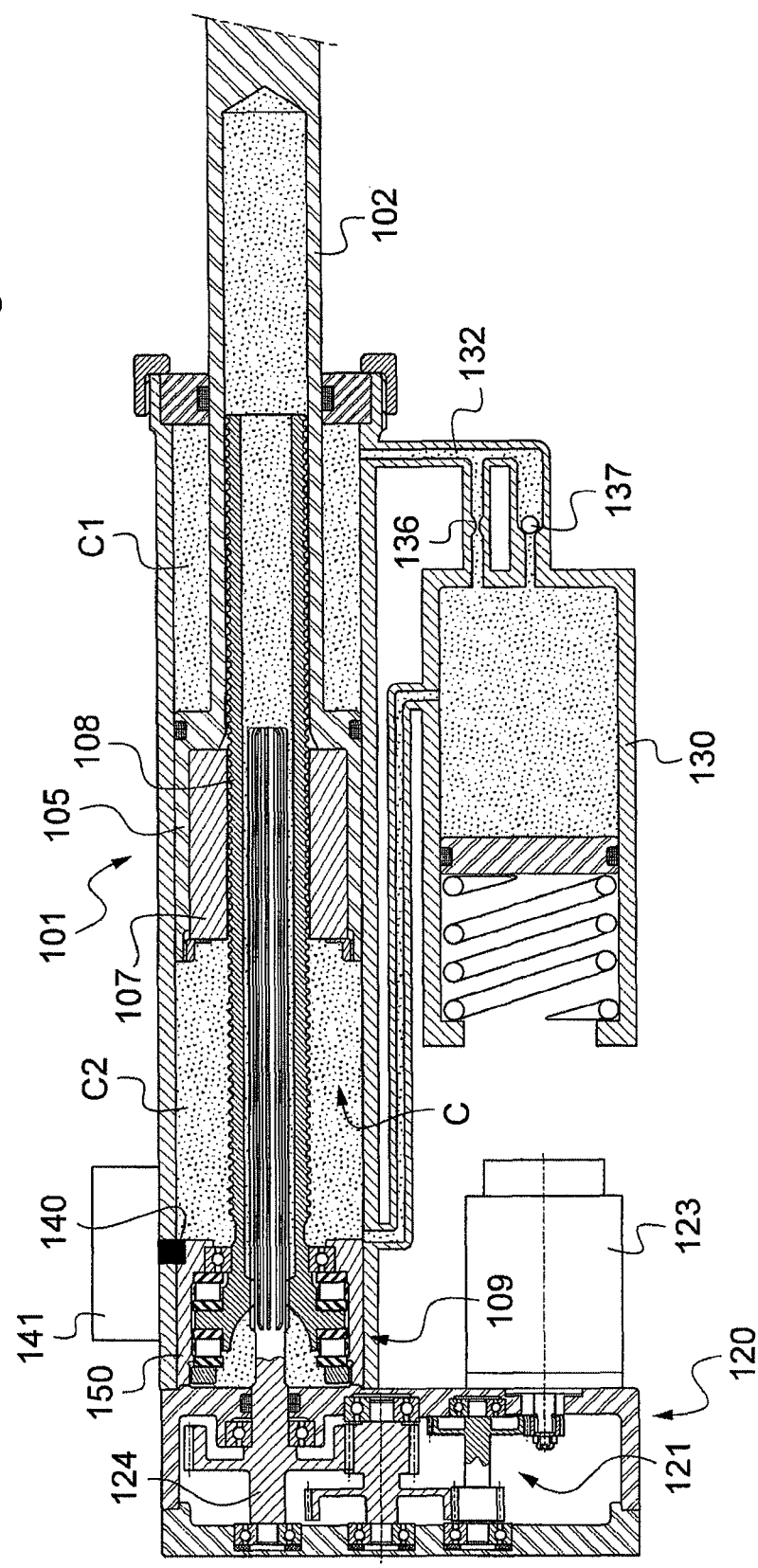
FIG. 2 is a longitudinal section view of an actuator in a second embodiment of the invention.

In a second embodiment shown in FIG. 2, elements that are in common with those shown in FIG. 1 are given the same references plus one hundred, the screw 108 now being associated with a guide bearing 109 suitable for sliding in the cavity C of the body 101. For this purpose, the bearing 109 has a cage 150 capable of sliding in the cavity C.

The bearing 109 is normally retained in its operating position by a movable finger 140 projecting into the cavity C to hold the guide bearing 109 in position, as shown. The finger 140 is secured to a retaining member 141 that normally holds the finger 140 so that its project into the cavity.

This arrangement is particularly advantageous when the helical connection between the screw 108 and the nut 107 is selected to be irreversible, thus enabling larger forces to be transmitted.

Figure 3:
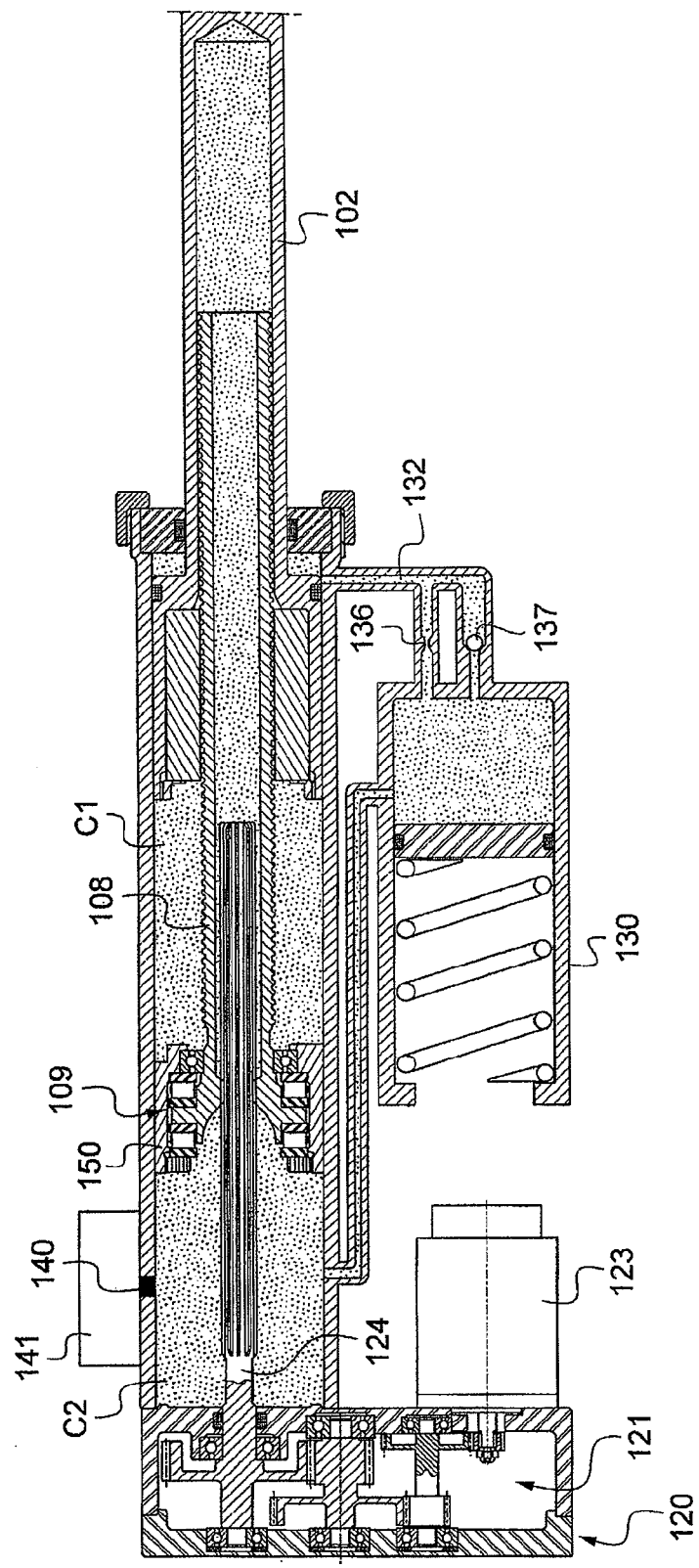
FIG. 3 is a longitudinal section view of the FIG. 2 actuator, shown after the guide bearing of the rod has been released.

In the event of a power supply failure to the electric motor 123, and as shown in FIG. 3, it is appropriate to cause the finger 140 to retract so as to release the guide bearing 109 to move axially so that the screw can be released axially, thereby enabling the rod 102 to be entrained and moved under the action of the load coupled thereto.

Such release may also be implemented in the event of mechanical jamming in the motor, in the gearing, or even in the screw, and more particularly in any moving part, naturally with the exception of the sliding of the rod.

Naturally, during such a movement, the fluid expelled from the chamber C1 is throttled and contributes to braking the rod and thus to regulating its travel speed. As it moves, the rod 102 entrains therewith the screw 108 and the guide bearing 109.

To make the guide bearing 109 return to its initial position, after it has once more become possible to cause the drive shaft 124 of the gearing 123 to turn, it suffices to turn the shaft in the opposite direction. This action causes the guide bearing 109 to return to its initial position, since the rod 108 has not moved. Thereafter, the finger 140 is actuated so that it projects once more into the cavity C, thereby blocking the guide bearing in position. Continued rotation of the drive shaft 124 then causes the rod 108 to move in the opposite direction.

Furthermore, if the helical connection between the screw 108 and the nut 107 is selected to be reversible, then the actuator has two alternative and redundant emergency modes, one similar to that described with reference to FIG. 1, and the other consisting in releasing the guide bearing 109 of the rod 108.

These actuators may be subjected to various monitoring or test procedures. In particular, the rod may be released intentionally so as to allow it to move under the action of the load against the hydraulic resistance opposed by the regulator means. For example, for an actuator that is intended to operate an undercarriage, it is possible to unlock the undercarriage and allow it to move down freely under the action of gravity to its deployed position. By measuring its descent time, it is possible to verify that the hydraulic regulator means of the invention are operating correctly, and in particular it is possible to detect any clogging (operating time longer than expected).

With reference more particularly to the actuator shown in FIG. 2, when the rod is in the extended position and is held in this position by the external load, it is possible deliberately to release the guide bearing 109 of the screw 108 and to cause the motor 123 to operate. The screw 108 then moves without the rod 109 moving. It is thus possible to cause the screw to perform a go-and-return trip in order to verify that the motor 123, the retaining member 141, and the screw-and-nut connection are operating correctly. Once this go-and-return trip has been performed, it is then appropriate once more to block the guide bearing 109 in position.

The invention is not limited to the above description, but on the contrary it covers any variant coming within the ambit of the invention as defined by the claims.

In particular, although the screw in both embodiments shown is driven in rotation by means of a fluted drive shaft, which is particularly useful in the second embodiment in which the screw is capable of moving axially, provision may be made for the screw to be driven directly by the motor, with or without intermediate gearing.

Although it is stated that the motor is permanently mounted on the actuator, provision could be made for it to be independent of the actuator.

Although in the actuators shown, it has been decided to isolate the hydraulic fluid from the gearing and the motor, it could also be decided, on the contrary, to immerse the gearing and/or the motor in the hydraulic fluid.

Although it is stated that the motor is mounted outside the cavity, provision could be made for it to be mounted inside the cavity. The motor would then be immersed in the hydraulic fluid.

Although it is stated that the drive shaft is coupled to the electric motor via gearing, the drive shaft could be directly engaged with the motor.

Although it is stated that the screw is mounted to slide without rotating on the drive shaft by means of fluting, more generally provision could be made for any other type of sliding connection, such as a finger or pin secured to one of those two elements and extending in a longitudinal slot in the other element.

Finally, although the means for conveying fluid from one chamber to the other as described herein comprise an accumulator located outside the actuator, the accumulator could be located inside it, e.g. at the end of the rod.

In certain circumstances, particularly if the two chambers are of substantially the same sectional area and cavitation is not to be feared, it might even be possible to omit the accumulator.

The means for conveying fluid from one chamber to the other may advantageously be no more than a calibrated passage through the bearing 5, which passage may be no more than grooves formed in the surface of the bearing. Under such circumstances, damping is present in both travel directions of the rod.

What is claimed is:

1. An actuator comprising:
    a body in which a rod is mounted to slide,
    the actuator including a screw extending inside the rod to co-operate with a nut secured to the rod, the screw being driven in rotation by a motor;
    the rod being associated with a piston that slides in a cavity of the body so as to define two chambers therein, the chambers being filled with hydraulic fluid and being put into communication via fluid transfer means fitted with at least one regulator means adapted to throttle the fluid expelled from one of the chambers, in at least one travel direction of the rod,
    the actuator including a drive shaft extending axially inside the screw for driving the screw in rotation, leaving the screw free to move in translation relative to the drive shaft, and
    the motor being arranged to drive the drive shaft in rotation, wherein the screw is guided in rotation by a guide bearing that is mounted slidably in the cavity of the body, the actuator including selective retaining means for retaining the guide bearing in position inside the cavity.

2. An actuator according to claim 1, wherein the transfer means comprise an accumulator for delivering or receiving a differential flow rate of fluid between the chambers.

3. An actuator according to claim 2, wherein the accumulator is disposed outside the body and the rod of the actuator, the accumulator being connected to the chambers via ducts, at least one of which ducts includes the regulator means.

4. An actuator according to claim 3, wherein the regulator means comprise a check valve mounted to pass fluid from the accumulator towards the chamber concerned, and a constriction connected in parallel therewith.

5. A method of monitoring an actuator, comprising a body in which a rod is mounted to slide, the actuator including a screw extending inside the rod to co-operate with a nut secured to the rod, the screw being driven in rotation by a motor; the rod being associated with a piston that slides in a cavity of the body so as to define two chambers therein, the chambers being filled with hydraulic fluid and being put into communication via fluid transfer means fitted with at least one regulator member adapted to throttle the fluid expelled from one of the chambers, in at least one travel direction of the rod, the actuator including a drive shaft extending axially inside the screw for driving the screw in rotation, leaving the screw free to move in translation relative to the drive shaft, the motor being arranged to drive the drive shaft in rotation, the screw being guided in rotation by a guide bearing that is mounted slidably in the cavity of the body, the actuator including selective retaining means for retaining the guide bearing in position inside the cavity,
    the method comprising the steps, when the rod is in the extended position, of releasing the guide bearing of the screw, powering the motor to cause the screw to perform a go-and-return trip, and then blocking the guide bearing in position.

6. An actuator comprising:
    a body in which a rod is mounted to slide,
    the actuator including a screw extending inside the rod to co-operate with a nut secured to the rod, the screw being driven in rotation by a motor;
    the rod being associated with a piston that slides in a cavity of the body so as to define two chambers therein, the chambers being filled with hydraulic fluid and being put into communication via fluid transfer means fitted with at least one regulator member adapted to throttle the fluid expelled from one of the chambers, in at least one travel direction of the rod, wherein the transfer means comprise an accumulator for delivering or receiving a differential flow rate of fluid between the chambers, wherein the accumulator is disposed outside the body and the rod of the actuator, the accumulator being connected to the chambers via ducts, at least one of which ducts includes the regulator member, and wherein the regulator member comprise a check valve mounted to pass fluid from the accumulator towards the chamber concerned, and a constriction connected in parallel therewith.

* * * * *